(No Model.) 2 Sheets—Sheet 1.
T. A. EDISON.
ELECTRIC METER.
No. 406,825. Patented July 9, 1889.
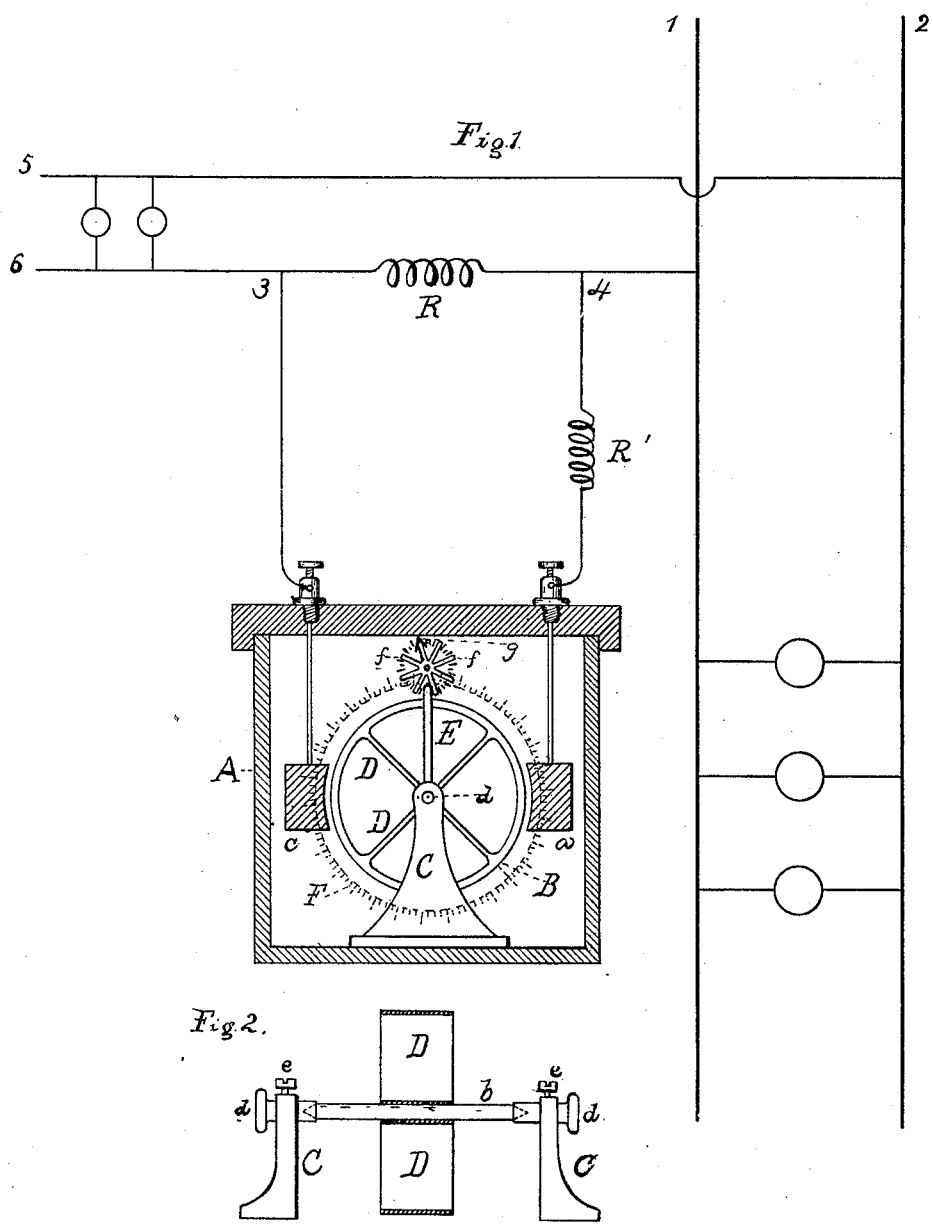
WITNESSES:
INVENTOR:
Thomas A. Edison
By Rich'd N. Dyer
Atty (No Model.) 2 Sheets—Sheet 2.
T. A. EDISON.
ELECTRIC METER.
No. 406,825. Patented July 9, 1889.
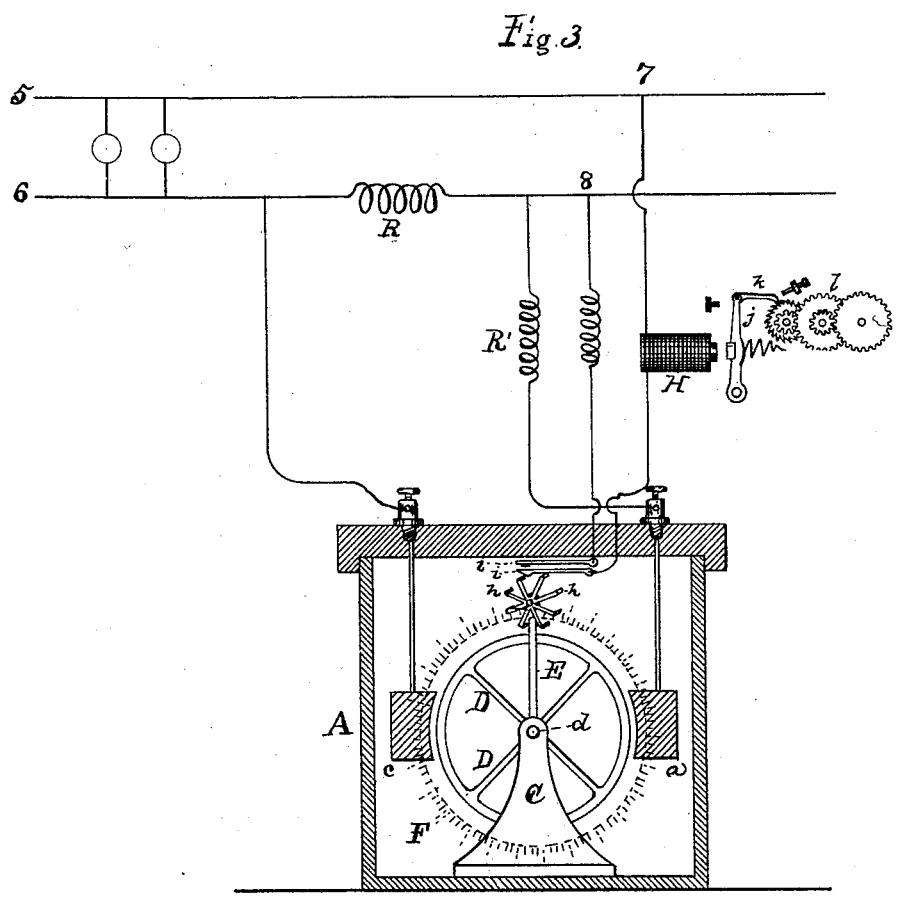
WITNESSES:
Edw. C. Rowlands
H. W. Seely
INVENTOR:
Thomas A. Edison
By Rich'd N. Dyer
Atty

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

ELECTRIC METER.

SPECIFICATION forming part of Letters Patent No. 406,825, dated July 9, 1889.

Application filed September 13, 1882. Serial No. 71,759. (No model.)

*To all whom it may concern:*

Be it known that I, THOMAS A. EDISON, of Menlo Park, in the county of Middlesex and State of New Jersey, have invented a new and useful Improvement in Electrical Meters, (Case No. 472,) of which the following is a specification.

My invention relates to electrical meters; and it consists in what I term an "electrolytic meter," in which a body capable of rotation is placed between the electrodes of an electrolytic cell, forming part of the circuit between them, and being caused to revolve by the increase of weight caused by deposition on the side adjacent to the anode and the decrease of weight on the other side caused by the removal of metal therefrom. The number of such revolutions is automatically indicated or registered, and the amount of deposition, and consequently the quantity of current passing through the cell, is thus determined.

In carrying out my invention I make use of an ordinary electrolytic cell placed preferably in a shunt-circuit from the main line whose current is to be measured, though it might, if desired, be placed directly in such main line. In the center of such cell is placed a hollow metal cylinder with open ends, preferably made of amalgamated zinc. This cylinder is supported on a shaft made of insulating material and having bearings on suitable standards.

Within the cylinder radiating from the axis are a number of flat paddle-blades, also preferably of amalgamated zinc, which of course revolve with the cylinder within the liquid of the cell, which liquid offers considerable resistance to the passage of such blades.

The anode and cathode of the cell, which are preferably amalgamated-zinc plates, are suspended one on each side of the cylinder. The current in passing between these electrodes of course selects the cylinder as a portion of its path, the resistance of such cylinder being much less than that of the liquid, and the metal from the anode is deposited on the adjacent side of the cylinder, and thus, increasing the weight of that side, the cylinder is caused to revolve.

On the opposite side the metal is removed from the cylinder and deposited on the cathode, and thus, one side of the cylinder being always heavier than the other, a continuous rotation is produced.

A registering apparatus is placed at a convenient point, and an arm is attached to the axis of the cylinder, which once during each revolution of the cylinder moves such registering apparatus, thus recording the number of revolutions; or, instead of this, the cylinder might be provided with means acting at a certain point in its revolution to close or open a circuit whose closure or opening causes the operation of the registering or indicating device. As such number of revolutions depends on the amount of metal placed on and removed from the cylinder, and this in turn on the amount of current passing in the circuit, the last is easily determined.

The main portion of the work done consists in turning the paddle-blades in the liquid, and consequently the friction of the shaft of the cylinder in its bearings becomes an unimportant factor, and any variations therein need not be considered in the calculations.

The invention may be better understood by reference to the drawings, in which—

Figure 1 is a sectional view of the meter with a diagram of the circuits; Fig. 2, an elevation showing the paddle-blades and insulating-supports for them and the cylinder, and Fig. 3 a view showing the modification of the registering apparatus mentioned.

A is the cell which contains the anode $a$ and cathode $c$, each being preferably an amalgamated plate of zinc. Such electrodes are in a shunt-circuit 3 4 from the multiple-arc circuit 5 6, which is the house-circuit whose current is to be measured, and which is derived from the main line 1 2. A resistance R is placed in conductor 6, so that the desired proportion of current may be diverted into the shunt.

B is the metal cylinder placed between the electrodes and revolving on a shaft $b$, which is preferably of glass with pointed ends.

C C are standards, preferably of hard rubber, through which pass hard-rubber pins $d$ $d$, held by hard-rubber screws $e$ $e$. The pins $d$ $d$ have cavities which form bearings for the ends of shaft *b*. The paddle-blades D D extend from the shaft *b* to the inner surface of the cylinder. The cell is filled with liquid, preferably a solution of sulphate of zinc, and the paddle-blades revolve in such liquid. An arm E attached to shaft *b* strikes the arms *f f*, Fig. 1, and moves the pointer *g*, thus recording the number of revolutions on a dial-plate. Another dial-plate F may be provided on which the arm E will record fractions of a revolution. Instead of this the arrangement shown in Fig. 3 may be employed. Here the arm E moves the arms *h h*, which force together the contact-springs *i i*, so that at each revolution of the cylinder the circuit 7 8 is completed through the magnet H, causing the armature *j* and pawl-arm *k* to operate a registering apparatus represented by the train of gearing *l*.

R' is a resistance used to compensate for variations of resistance caused by changes of temperature in the cell, this resistance being affected by such changes oppositely to the liquid in the cell.

What I claim is—

1. The combination, with the electrodes of an electrolytic cell, of a rotating body forming part of the circuit between them and caused to revolve by the differences in weight between its two sides, due to the deposition and removal of metal, substantially as set forth.

2. In an electrolytic-cell meter, the combination of an electrolytic cell, the electrodes thereof, the cylinder placed in the cell, forming part of the circuit through the cell, and caused to revolve by variations in weight, as described, with means for registering the number of revolutions of said cylinder, substantially as set forth.

3. In an electrolytic-cell meter, the combination, with the electrodes of the cell and the revolving cylinder, of the paddle-blades carried by said cylinder and immersed in the liquid of the cell, substantially as set forth.

4. In an electrolytic-cell meter, the rotating cylinder having an exterior surface of amalgamated zinc, in combination with the anode and cathode plates, also of amalgamated zinc, said cylinder being located in circuit between the said electrodes, substantially as set forth.

This specification signed and witnessed this 25th day of August, 1882.

THOMAS A. EDISON.

Witnesses:
H. W. SEELY,
EDWARD H. PYATT.